United States Patent
Stein et al.

(10) Patent No.: US 8,661,122 B2
(45) Date of Patent: Feb. 25, 2014

(54) METHOD FOR MONITORING ACCESS NETWORKS

(75) Inventors: Shai Stein, Hod Hasharon (IL); Moshe Aharon, Ra'anana (IL); Alberto Schliserman, Modiin (IL)

(73) Assignee: ECI Telecom Ltd., Petach-Tikva (IE)

( * ) Notice: Subject to any disclaimer, the term of this patent is extended or adjusted under 35 U.S.C. 154(b) by 315 days.

(21) Appl. No.: 13/143,716

(22) PCT Filed: Nov. 25, 2009

(86) PCT No.: PCT/IL2009/001108
§ 371 (c)(1),
(2), (4) Date: Jul. 7, 2011

(87) PCT Pub. No.: WO2010/079471
PCT Pub. Date: Jul. 15, 2010

(65) Prior Publication Data
US 2011/0270981 A1 Nov. 3, 2011

(30) Foreign Application Priority Data
Jan. 8, 2009 (IL) .......................... 196406

(51) Int. Cl.
*G06F 15/173* (2006.01)
*H04L 12/26* (2006.01)

(52) U.S. Cl.
USPC ......... 709/224; 709/219; 455/452.2; 370/252

(58) Field of Classification Search
USPC .......... 709/224, 231, 219; 370/390, 235, 342, 370/252; 725/114; 717/178; 455/452.2
See application file for complete search history.

(56) References Cited

U.S. PATENT DOCUMENTS

| 6,693,907 B1 | 2/2004 | Wesley et al. | |
|---|---|---|---|
| 2006/0069799 A1 | 3/2006 | Hundscheidt et al. | |
| 2006/0265709 A1* | 11/2006 | Meaney | 717/178 |
| 2008/0049703 A1* | 2/2008 | Kneckt et al. | 370/342 |
| 2008/0098446 A1* | 4/2008 | Seckin et al. | 725/114 |
| 2008/0291828 A1* | 11/2008 | Park | 370/235 |
| 2009/0245248 A1* | 10/2009 | Arberg et al. | 370/390 |
| 2011/0149961 A1* | 6/2011 | Jarredal | 370/390 |

OTHER PUBLICATIONS

Komosny et al., *Tree Structure for Source-Specific Multicast with Feedback Aggregation*, Publisher: unknown, Date: unknown; pp. 1-6.
International Search Report mailed Mar. 22, 2010 in International Application PCT/IL2009/001108, filed Nov. 25, 2009.
Ott et al., *Extended RTP Profile for Real-Time Transport Control Protocol (RTCP)-Based Feedback (RTP/AVPF)*, The Internet Society, Jul. 2006; pp. 1-51.
Schulzrinne et al., *RTP: A Transport Protocol for Real-Time Applications*, RFC3550, Publisher: unknown, Jul. 2003; p. 1-96.

* cited by examiner

*Primary Examiner* — Jungwon Chang
(74) *Attorney, Agent, or Firm* — Novick, Kim & Lee, PLLC; Harold L. Novick; Jae Youn Kim

(57) ABSTRACT

A technique enabling an access node to undertake more responsibility and render multicast streaming more effective by utilizing streaming service control messages SSCP which contain important information such as Quality of Experience or Quality of Service. The access node itself or in cooperation with a processing/monitoring entity may be enabled to analyze QOE data in SSCP report messages from different access network receivers, to identify specific receivers which encounter problems and to indicate the problems to the provider of the network.

7 Claims, 5 Drawing Sheets

METHOD FOR MONITORING ACCESS NETWORKS

RELATED APPLICATIONS

This is an US National Phase Patent Application Under 35 USC §371 of International Patent Application No. PCT/IL2009/001108, filed on Nov. 25, 2009, which claims priority of Israeli Patent Application No. 196406, filed on Jan. 8, 2009.

FIELD OF THE INVENTION

The present invention relates to the field of signaling/messaging in broadband access networks being wire-line (non-cellular) networks. More specifically, the invention relates to a technology for evaluation of quality of service (Quality of Experience or QOE) in the mentioned access networks utilizing multicast services.

BACKGROUND OF THE INVENTION

Multicasting of telecommunication services to access subscribers is a common modern solution for providing, to groups of the access subscribers, such broadcast services as TV services, video on demand and the like from a sender located beyond the access network.

In order to provide multicast services to a number of access subscribers, the required broadband service is sent as a single stream by a source/sender to an access node, and then the access node multicasts the received stream to the subscribers that ordered it.

Modern standard streaming protocols allow not only for streaming the required services, but also for evaluation of Quality of Experience (QOE), by collecting the QOE data from receivers of the services and by forwarding the collected QOE data to the source of the stream (at application layer).

However, in modern access networks, the above-mentioned method of QOE evaluation fails due to several reasons, and mainly due to the fact that the number of subscribers is very high so the sender of the multicast services cannot be aware of all the subscribers (receivers).

To be more specific, the presently known actual streaming applications utilize the following types of standard protocols:
  Data forwarding protocols (e.g. RTP—Real time Transport Protocol) for the actual forwarding of the streamed data packets. The data forwarding protocols may include UDP (User Datagram Protocol) or TCP (Transport Control Protocol) for packet transport, and IP (Internet Protocol) for packet forwarding. The IP protocol allows both the unicast and the multicast forwarding of the frames.
  Streaming control protocols (e.g. RTSP—Real Time Streaming Protocol) for controlling the streaming of the packets. The streaming control commands may include start, stop, fast forward rewind and other streaming commands.
  Streaming service control protocol (e.g. RTCP—RTP Control Protocol) for conveying control messages between the sender and the receiver(s). These messages allow the sender to indicate to the receiver how many packets were sent, and allow the receiver to respond how many packets were received, how many are missing, or are received with errors, etc. These protocols should allow the sender to modify the nature of streaming according to the reports received from the receivers.

For unicast conditions (one sender to one receiver), the above-described functions of the standard streaming protocols are performed properly. In cases where multicasting is required, the streaming protocol relies on the IP multicast data forwarding protocol to produce multiple streams to the users. However, the standard streaming control protocols cannot be used since, when one of the receivers commands to affect its specific stream, it affects all the remaining multicast streams and receivers. Such a situation is non-acceptable; as a result, the multicast streaming is not controlled today.

As to the streaming service control protocols, they theoretically can be used for multicast cases; however, the problem of numerous feedback responses sent by numerous receivers/subscribers to one and the same source makes these protocols problematic, at least due to the necessity to process all the responses.

IETF RFC 3550 [1], Tree Structure for Source-Specific Multicast with Feedback Aggregation [2] and US published application US2006/0069799 AA [3], describe several methods that allow multicast forwarding of control packets from sender to multiple receivers and further aggregation of receivers' feedback packets, sent from the receivers to the sender/source, at an intermediate node. These methods suppose that there is an ability of the streaming application in the sender to analyze and adapt the downstream service based on the aggregated feedback QOE control packets from the receivers.

However,
  The sender's application is typically unaware of the specific receivers. This is a result of the multicast method in access nodes that multicast the streamed data based on previously learned data (usually via IGMP protocols).
  Even if the sender application were aware of the receivers it could not do anything in response to the obtained streaming service control data (QOE), since for the sender application, any loss or error in a packet for a specific receiver must not degrade the user experience of the many other receivers that receive the same stream but, say, without errors.
  Even if the burden on the sender applications is alleviated by aggregating the data on the path from the many receivers to the sender (as it was suggested in [1] and [2]), functionally there is nothing meaningful the sender application can do with the aggregated data for the same reasons: 1) the receivers are unknown and 2) that the streaming must continue to all receivers even in case when one of them has degraded.

To the best of the Applicant's knowledge, none of the presently known streaming applications and none of the streaming service control protocols discuss how to handle QOE data collected from multiple receivers which are often unknown to the sender, none of them proposes an idea how to use this type of data, and none of them discusses or uses specific features of wire line access networks for handling that data.

OBJECT AND SUMMARY OF THE INVENTION

In view of the above-mentioned problems, the Inventors have recognized the following:
  1. An access node of the access network can be utilized so as to undertake more responsibility and make the multicast streaming more effective.
  2. The streaming service control messages SSCP, which are not used for multicast services at the present stage, contain important information. It is the information on the so-called Quality of Experience (QoE) or Quality of Service (QoS) of the streaming service as perceived by numerous receivers of the access network. This information is presently thrown away, while it could serve some important needs of the access network.

In the frame of the present application, the QOE data comprised in the SSCP messages should be understood as an informative portion reflecting one or more parameters of the streamed data, for example the number of lost frames, the Bit Error Rate (BER) value, the Packet Error Rate (PER) value, the noise ratio, etc.

The Inventors therefore see some important functions which are new for a modern access node that handles multicast traffic for numerous access network receivers.

For example, the first of them is as follows:

The access node itself, or the access node in cooperation with some hardware/software entity (say, a processing and monitoring entity) may be enabled to analyze the QOE data in the SSCP report messages, to identify specific receivers which encounter "bad" QOE and to indicate problems to the provider of the network. Once such condition is identified, it allows performing some activities to remedy the problem.

Therefore, to make multicasting in access networks more effective and utilize SSCP messages (streaming service control protocol messages), the Inventors propose a Method, a System, an Access Node and a Monitoring Entity which, separately and together, implement the proposed new technology.

First of all, there is proposed a method for handling SSCP messages received at an access node that serves an access network, the method comprises:

multicasting, by the access node, a traffic stream generated by a source, to two or more access network receivers, wherein a Streaming Service Control Protocol SSCP is utilized for said traffic stream and wherein each of said receivers is served via a transmission path in the access network, processing SSCP report messages received at the access node from said two or more receivers, comprising analysis of Quality of Experience (QOE) data retrieved from said SSCP report messages;

based on the analyzed QOE data, providing status information, wherein the status information comprises indication of problems, if any, per access network section wherein the access network section includes a receiver out of said two or more receivers and a transmission path associated with said receiver in the access network;

using the status information in monitoring the access network.

The above method may also be called a method of forming an inventory data base for an access network. The method may then comprise registering the status information, and/or may comprise managing the network based on that information.

The step of providing the status information may comprise generating a QOE evaluating message per multicast session, forwarding the message to a monitoring entity and registering the status information in said entity. The method may further comprise: accumulating and updating the status information about said receivers and their associated transmission paths; forming indications of persistent problems in the transmission paths and generating alerts about the persistent problems.

Preliminarily, the processing may comprise steps of handling an SSCP sender message received by the access node with said traffic stream transmitted from the source, and further comparing said sender SSCP message with the report SSCP messages received at the access node from the two or more receivers.

The comparing may comprise checking of at least one of the following parameters of the QOE data: a number of lost frames, BER value, PER value, noise ratio at a specific receiver in comparison with a threshold value set for the respective parameter and in comparison with the respective parameter in the sender SSCP message. The analyzing of the QOE data may comprise filtering floods of said SSCP report messages indicating similar errors.

The method may further initiate maintenance and/or repair operations based on the indication of problems in the access network.

To implement the above method, there is also provided a system for handling SSCP messages, comprising at least one access node AN, at least one processing unit PU and at least one monitoring entity ME, wherein AN out of said at least one AN is supporting a Streaming Service Control Protocol SSCP and serving two or more access network receivers of an access network via two or more respective transmission paths; the access node being capable of multicasting a traffic stream, generated by a source, to said two or more access network receivers and to receive report SSCP messages from said two or more receivers;

said at least one processing unit PU being adapted to process the report SSCP messages, form status information and supply it to said at least one monitoring entity ME, wherein the processing comprising analysis of Experience data (QOE data) retrieved from said SSCP report messages, the status information being formed based on the analyzed QOE data and comprises indications of problems, if any, per access network section, wherein said section includes a receiver out of said two or more receivers and a transmission path associated with said receiver in the access network;

said at least one monitoring entity ME being capable of at least monitoring the access network using said status information.

Arrangement of the above-mentioned units in the system can be selected in accordance with a specific preferred configuration. For example, AN may incorporate both PU and ME; AN may incorporate PU while ME remains a separate unit; AN may be a separate unit while ME may be merged with PU.

From the point of view of location of the above units in the networks, various options may exist as well. For example, more than one PU and more than one ME may serve more than one AN of the access network, PU and ME may either reside in one location, or be distributed between two or more of the following locations: a Network Management and/or Service system NM/SS, a Central Office serving the access network, a Network and/or Service provider, at least one access node, at least one network node in the access network, at least one network node beyond the access network, etc.

The monitoring entity of the system may be further capable of generating alerts for performing repair and maintenance operations in the access network, based on said indications.

The system may be further adapted to perform one or more of the following functions:

filtering the status information to distinguish problematic receivers and their associated transmission paths versus non-problematic ones;

identifying persistent problems related to specific problematic receivers and their associated transmission paths, identifying problems of peak-time consumption of multicast services, generating alerts;

initiating corrective actions if needed.

In view of the above-mentioned various options of arrangement and allocation of the system components, the present invention also provides independent protection to an Access Node AN enhanced to possess the novel functions, and to a Monitoring Entity ME which allows providing the novel functions in cooperation even with a conventional Access Node(s).

The inventive Access Node AN should be suitable for handling multicast traffic to and from multiple subscribers, e.g. Digital Subscriber Line (xDSL)/Passive Optical Network (xPON), Point to Point Ethernet traffic, etc. The inventive access node AN can be designed on the basis of such modern access equipment as a DSLAM (Digital Signal Line Access Multiplexer), an MSAN (Multiservice Access Node), or the like.

The Access Node may be operative to provide the status information by generating a QOE evaluating message per multicast session. The Access Node may be further adapted to process an SSCP sender message, received at it with said traffic stream sent from the source, and to compare said SSCP sender message with said SSCP report messages. The Access Node may be further capable of filtering floods of said SSCP report messages indicating similar errors.

In the above definitions, the transmission path should be understood as comprising a fixed section in the access network, terminated with and including the receiver's equipment. In contrast with wireless networks, status information about such fixed sections in the access networks of interest can be collected gradually, since their characteristics do not change quickly. The status information can be registered and accumulated to indicate (by means of a responsible entity such as ME) some persistent problems in specific transmission paths. The status information with indications of problems, and/or the registered persistent problems' indications can be then used for producing alerts/alarms, monitoring the access network and finally for management, e.g., for handling the problems off line.

The access network may constitute a wire-line access network such as any Digital Subscriber Line (XDSL), any Passive Optical Network (XPON), Point to Point Ethernet (PtP Ethernet), etc.

The source of the traffic stream should be understood as a node which, in a general preferred case, is located beyond the access node. However, in some specific cases, the access node may serve as the source that performs multicasting, for example, for diagnostic purposes, for building the complete data base comprising status information about all receivers in the access network, etc.

In the general and more practical case, the traffic stream is transmitted from the source, located beyond the access network and the access node, towards multiple receivers belonging to the access network, but the transmission is performed via the access node. The access node should be adapted to process SSCP sender messages received with said traffic stream sent from the source.

This preliminary processing will further allow evaluation of the report SSCP messages obtained at the access node from the two or more multicast receivers of the multicast traffic stream.

The step of providing the processed QOE information to the Monitoring Entity (directly from the Access Node, or via the Processing unit) preferably comprises generating a so-called QOE evaluating message per multicast session, forwarding the message to the entity and registering the status information in a suitable data base.

In some cases, an SSCP message sent by the AN to the source as the AN report message can be used for forming the QOE evaluating message.

The system and, more specifically, —the monitoring entity ME is preferably responsible for management and/or service of the access network. ME is preferably adapted to accumulate and update the status information in the status data base, to form indications of persistent problems in the transmission paths and in particular in their fixed portions per multicast receiver, to generate alerts/alarms in response to the status information and/or to the persistent problems and to initiate management and/or service operations for eliminating the problems in specified transmission paths/receivers. For example, the network/service provider, using the information and/or the alerts provided by the ME, will be able to send a technician to the premises of a specific "problematic" receiver. The proposed management would allow performing effective and focused repair and maintenance operations in the access network.

In the monitoring entity, the QOE information may be received from AN out of said at least one AN in the form of a QOE evaluating message.

The QOE information may be received in the ME from AN out of said at least one AN in the form of a copy of an SSCP message sent by the AN to the source as a report message.

The data base which stores and updates the status information about all receivers and their associated links in the access network can be called an QOE inventory data base of the access network and used accordingly.

It should be noted that alternative techniques to produce such data about status of receivers and links in the access network are much more complicated and include dedicated hardware for the purpose of QOE analysis.

The second function which is believed to be important and novel is the following. The access node can be enabled to process (aggregate, filter, analyze, etc.) floods of "error messages" (i.e., messages with error indications in the QOE) of the streaming service control protocol (SSCP). This relates both to SSCP sender messages arriving to the access node with the incoming traffic stream and to SSCP report messages arriving from the multicast receivers to the access node. For example, in case one packet is missing at the input to the access node, it is not retransmitted, so all receiver applications will mark it as an error (the reports will comprise the similar error indications). The access node can detect/identify that such a case has occurred, by comparing the SSCP reports obtained from different receivers; the access node may treat the reports differently in this case, e.g. such an error messages flood may be ignored because the problem is located in another part of the network.

Still further, the technology may comprise representing the status information as a QOE map of the access network and possibly storing it in the data base. The representation can be performed in the form of a map allocating specific problems in the receivers and/or the transmission paths (links) associated with the receivers.

Yet another embodiment of the proposed technology may comprise optionally storing, in said data base, status information concerning QOE of the access node as a receiver of at least one said traffic stream transmitted by the source. Such access node status information comprises at least QOE data obtained from an SSCP message being a report of the access node to the source upon receiving the mentioned traffic stream.

As has been mentioned, the processing of said reports preferably includes preliminary processing/handling of a sender SSCP message received at the access node with said traffic stream; results of the preliminary processing of the sender's message may be further compared with said reports.

To perform the preliminary processing of the SSCP messages, the access node may act, for example, as a "snooping node" or as a "proxy node".

In the first case, the preliminary processing may comprise a so-called "snooping" of the sender's SSCP message, which includes looking into the sender's message at the access node, registering its data, and sending the sender's message as is to the multicast receivers. The processing then comprises obtaining SSCP receivers' messages (the receivers' reports) at the access node, comparing them with the sender's message, analyzing, aggregating the reports at the access node and issuing towards the source node an aggregated SSCP message.

In the second case, the preliminary processing may comprise storing the sender's SSCP message, converting it at the access node (which serves as a proxy), and issuing the converted SSCP access node (AN) message to the multicast receivers. The processing comprises receiving at the access node SSCP receivers' messages (reports of the multicast receivers), comparing the reports with the sender's SSCP message, analyzing and forming not just an aggregated message, but an SSCP access node (AN) receiver message which is sent from the access node towards the source node.

The proxy access node may be preferable since it is capable of sending its own additional messages, for example in case of detecting a problem in one or more transmission paths, it may send verifying messages to check whether the problem indeed persists.

The comparison and analysis of the QOE data in the reports may comprise analyzing the number of lost frames/the BER value/PER value/the noise ratio etc. at a specific receiver in comparison with a threshold value set for the respective parameter and with the value of the respective parameter in the sender message.

Status information formed about links/receivers in the data base, when accessed by the network and/or service provider, serves a tool for determining problematic links, receivers, for detecting congestion-affected regions in the access network, etc.

Examples of problems and suitable analysis that can be performed in this way are:
  Excess Packet Error Rate (PER) can be understood from the Receivers SSCP messages. Once identified, a Trouble Ticket can be created to analyze the causes of the malfunction. This can be done by the ME in the Service Provider even before the user complains.
  Tracking of time of day related aspects of the QOE may reveal congestion problems related to peak time usage of the access links.

The proposed technique may further comprise performing one or more of the following functions by the system (or more specifically, by the monitoring entity ME):
  Filtering the status information in the data base to distinguish problematic receivers and their associated links versus non-problematic ones;
  Identifying persistent problems related to a specific receiver and initiation of corrective actions as needed;
  Identifying persistent problems in links between the source and the receivers and initiation of corrective actions if needed;
  Identifying problems of peak-time consumption of multicast services;
  Generating alerts and initiating maintenance and/or repair/corrective operations if needed, based on the status information received/accumulated at the monitoring entity.

The QOE information in the ME may be received from AN out of said at least one AN in the form of a QOE evaluating message. The QOE information may be received from AN out of said at least one AN in the form of a copy of an SSCP message sent by the AN to the source as a report message.

According to yet another aspect of the invention, there is further provided a software product comprising computer implementable instructions and data stored on a non-transitory computer readable medium; the software product being capable of implementing operations of the described method, when being installed and run in a computer system. Such a computer system may, for example, be a system distributed between a number of locations in the network.

BRIEF DESCRIPTION OF THE DRAWINGS

The invention will be further described in detail with reference to the following non-limiting drawings in which.

DETAILED DESCRIPTION OF THE PREFERRED EMBODIMENTS

Figure 1:
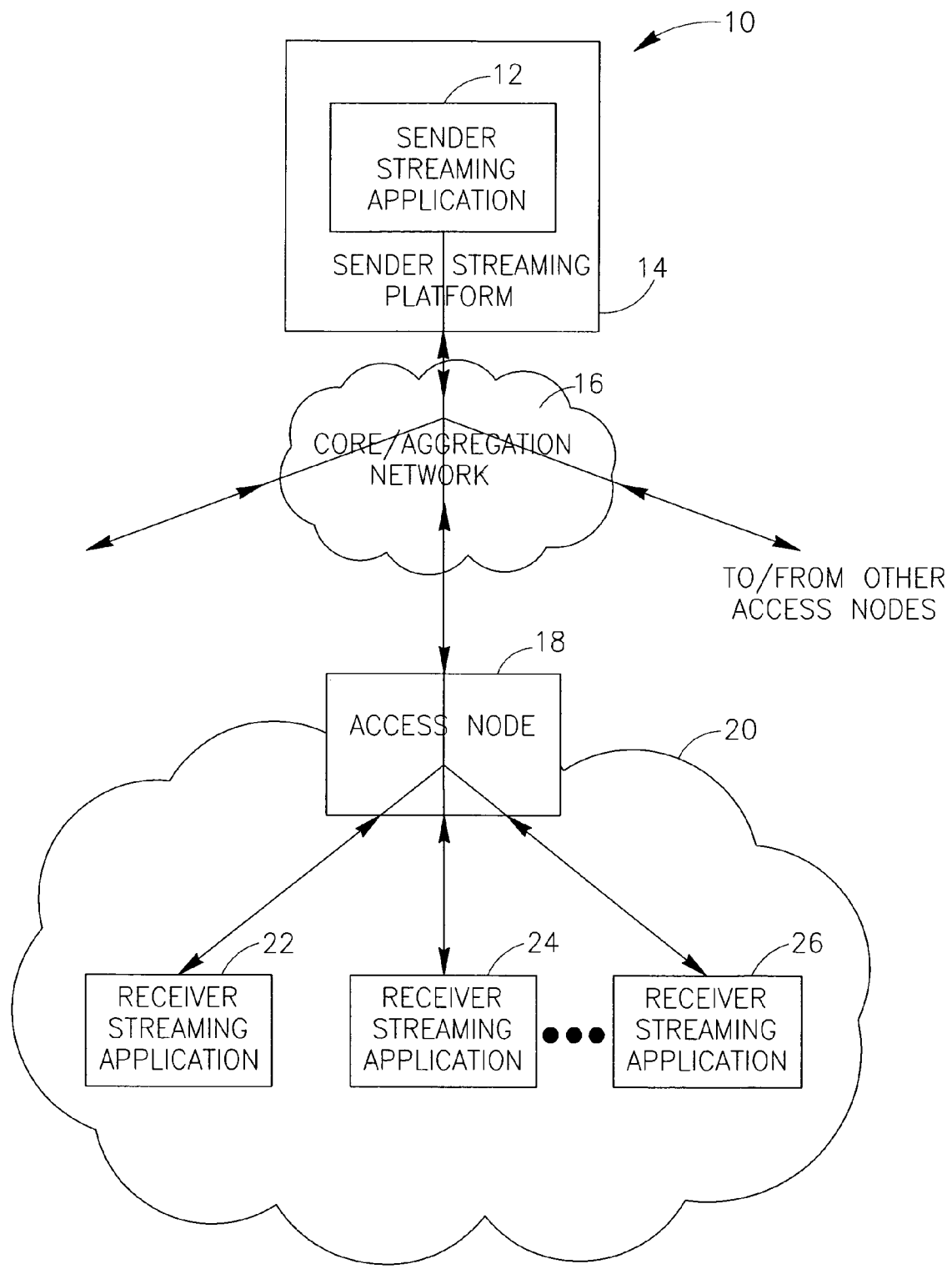
FIG. 1 (prior art) schematically illustrates a route of a traffic stream transmitted from a source node to an access node, and there-from to multiple receivers, as a multicast traffic stream.

FIG. 1 shows a general widely accepted scheme of providing a stream of data packets from a Sender 10 to multiple Receivers marked 22, 24 . . . 26 located in an access network 20, being performed via a transport network (called here core or aggregation network) 16 and an access node 18. The Sender 10 is provided with a Sender Streaming Application 12 and a Sender Streaming Platform 14 which together allow utilizing the protocols necessary for streaming data downwards and upwards (i.e., a data forwarding protocol, a streaming control protocol and a streaming service control protocol). The receivers 22-26, each utilizing a suitable receiver streaming application, are expected to return their control messages responses that indicate service status, to the Sender 10 via the access node 18 and the transport network 16. The data stream transmitted by the Sender 10 can be multicast at the core/aggregation network 16 so as to reach not only the access node 18 but also other access nodes (not shown) which, in turn, return to the Sender their responses and reports. In that specific example, the Sender 10 can be a videoserver providing a video stream over RTP/RTSP/RTCP Streaming Application 12, the network 16 can be any packet transport network that is suitable for handling various multicast traffic technologies, for example over IP and/or over MPLS and/or over Ethernet." The access node (AN) 18 can be any type of equipment suitable for handling multicast traffic to and from multiple subscribers, e.g. the XDSL/XPON or Point to Point Ethernet traffic. The receivers 22-26 are any type of receivers located in a home network, like a Set top box and TV, a PC with its display, etc. The inventive solution which will be explained below is applicable, for example, to the basic configuration illustrated and described with reference to FIG. 1.

Figure 2:
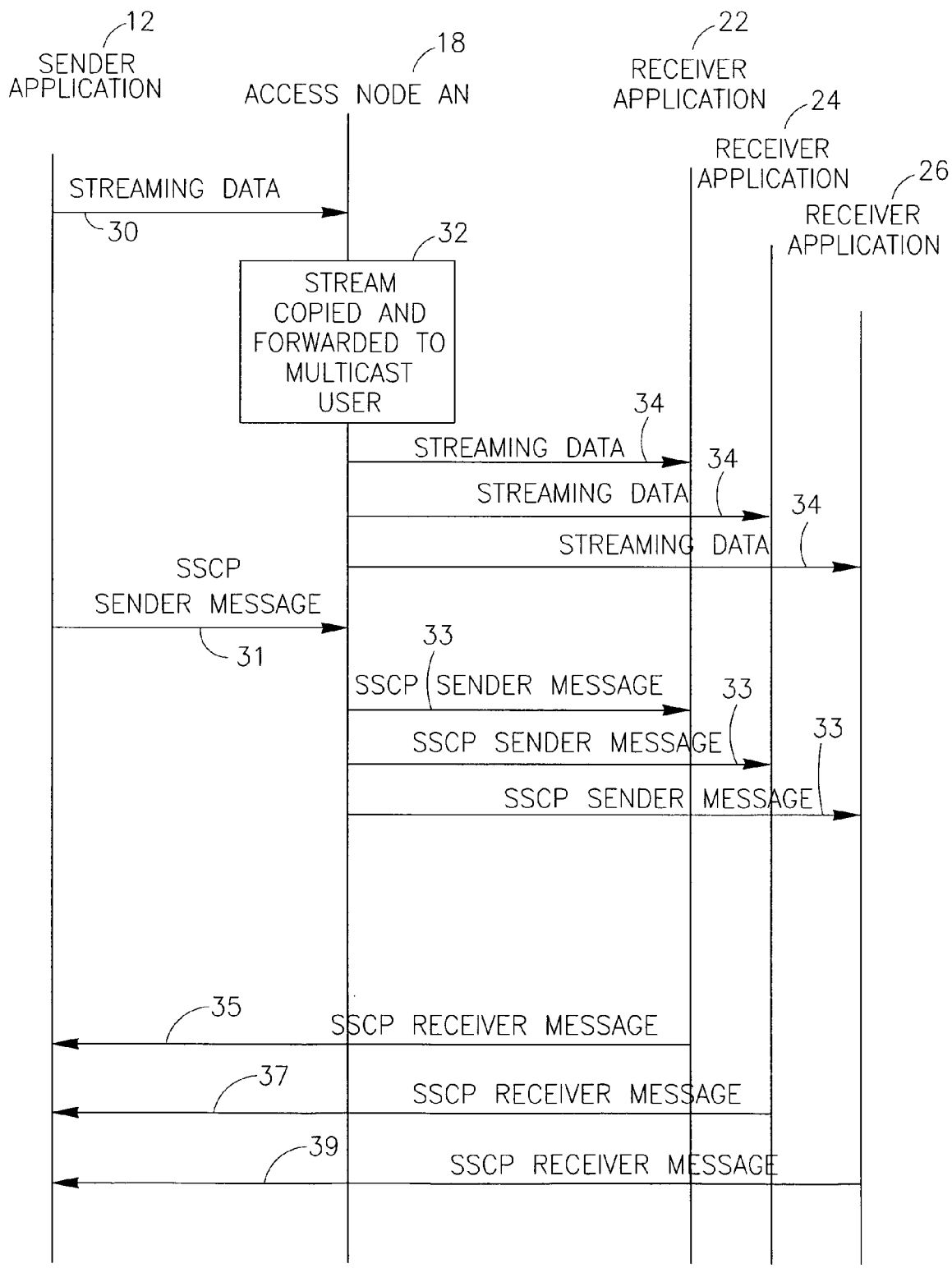
FIG. 2 (prior art) shows a chart schematically illustrating how SSCP messages are presently handled in access networks utilizing multicast traffic streams.

FIG. 2 (prior art) presents a schematic chart which illustrates how data and messages of streaming service control protocol (SSCP messages) travel between the Sender 10 and receivers 22-24 of FIG. 1 in presently known network systems which utilize multicasting at access node 18.

The Sender's Application 12, by using its data forwarding protocol, causes streaming of data packets (30) from the sender 10 up to the access node 18. At the access node 18, the data stream is copied and forwarded to multiple users (receivers) in the access network 20 by multicasting (32). The copied data streams (34) arrive to receivers 22, 24, 26.

Inter alia, the Sender's Application 12 also provides a sender's Streaming Service Control message (SSCP message) 31 which reaches the access node 18 and is transparently forwarded to the multicast receivers as a number of SSCP messages 33.

The Receivers' Streaming Applications ensure that the receivers 22, 24, 26 return to the Sender SSCP receiver messages (reports) 35, 37, 39 where each of them should report to the sender about Quality of Experience of receiving the streams 34 of data packets. Theoretically, the sender (i.e., the sender's streaming application) should be capable of adjusting its operation based on SSCP reports obtained from receivers of the streamed data packets.

As has been mentioned in the Background section of the invention, the sender application 12 is usually non-aware on the quantity and identity of the multiple receivers to which the data stream is transmitted by multicasting. Therefore, effectiveness of the reports 35, 37, 39 received at the sender's application 12, is almost zero.

Figure 3:
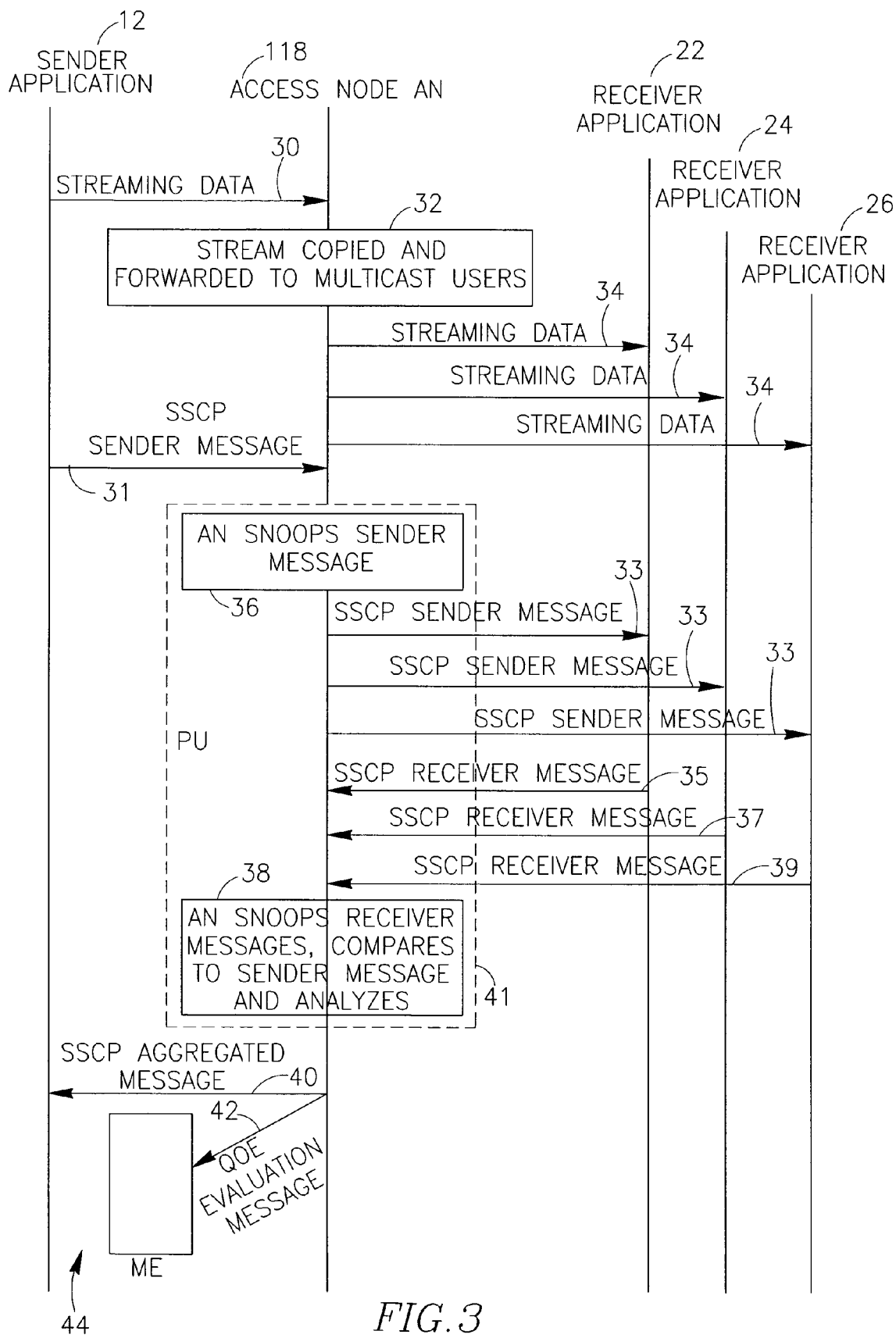
FIG. 3 is one example of the proposed technology for handling SSCP messages in access networks.

FIG. 3. The present invention proposes that the access node, or a system comprising the access node, be provided with a new intermediary (additional, supplementary) function taking place between the sender application and a receiver application for the purpose of collecting, aggregating, analyzing and reporting data sent by the receivers via the streaming services control protocol SSCP (for example such as formal RTCP [1]). This intermediary function, while being new as is, seems ideal for creating a data base of access network receivers (and their associated transmission paths) from the point of view of QOE. We keep in mind that the QOE data is reflected in the SSCP reports of the receivers.

Conventional functions of the access node are illustrated and marked in FIG. 3 similarly to the way it has been made in FIG. 2.

One method for implementing the newly proposed intermediary function is a so-called snooping method, schematically presented in the chart of FIG. 3 as follows. In FIG. 3, the modified access node is marked 118. While the conventional functions/blocks are marked with the same reference numerals as in FIG. 2, new functions/blocks are indicated with differing reference numerals.

The Access node 118 "snoops" sender SSCP messages such as 31 and forwards them untouched to all multicast receivers (for our example, to 22, 24, 26). That operation is performed in a snooping block 36, which can be considered part of a newly proposed Processing Unit PU 41, and refers to a method to learn the message contents without affecting its forwarding (as any other packet). The contents of the sender message is registered and will serve for future decisions made by the access node after the feedback receiver messages (report SSCP messages) are handled by it.

The Access Node 118, using a new analyzing block 38 which forms another portion of the inventive Processing Unit PU 41, snoops the receivers' report SSCP messages, compares them to the data registered from the Sender SSCP messages. Suppose that the results of the analysis performed in block 38 will yield a receiver with a problematic link (transmission path). The behavior of the link can be further tracked with the aid of block 38, to see if the problems are persistent. Indication of the problem can be sent to a monitoring entity ME 44 comprising a data base and schematically shown by a box 44. The monitoring entity may, for example, belong to a network operator or a service operator. Details of how the network/service operator can be informed will be explained below. The Access node 118 can further aggregate the receivers' SSCP messages (the aggregation is optionally comprised in block 38). Such aggregation is not a collection of all messages into one single SSCP header but a functional collection in which the access node analyzes the root cause of the problem and produces only the SSCP data related to it. For example, if the same data packet was not received by all receivers, then only one indication of this packet loss will be sent to the Sender in the frame of the SSCP Aggregated message 40, instead of the many loss indications from all the receivers.

The Access Node 118, in addition to its novel snooping and analyzing functions, issues a QOE evaluation message 42 to a newly provided monitoring entity ME 44. The QOE evaluation message reflects QOE data of the multicast receivers 22, 24, 26. In the specific preferred case, the message 42 comprises information about QOE problems, if any, in one or more of the specific receivers (and their associated transmission paths/links). As an option, a copy of the SSCP aggregated message 40 can be used for informing the ME 44; such a message will be further processed in the ME to obtain status information on problems, if any, of specific receivers/paths.

It should be added that the ME 44 can be organized in any entity intended for management and service of the access network, and even be distributed there-between. It can be a Central Office (CO) of the access network, a management unit in the access node such as DSLAM or MSAN, a Network or Service management system which is in charge of the access network 20, a Network Provider, etc.

Similarly, the processing unit PU (at least its analyzing block 38) may be located beyond the access node, for example be merged with the monitoring entity ME. In this case, the access node remains almost conventional and should just provide the PU & ME with information about the report SSCP messages or even with copies of these messages (see 35, 37, 39 of the access node 18 in FIG. 2).

Figure 4:
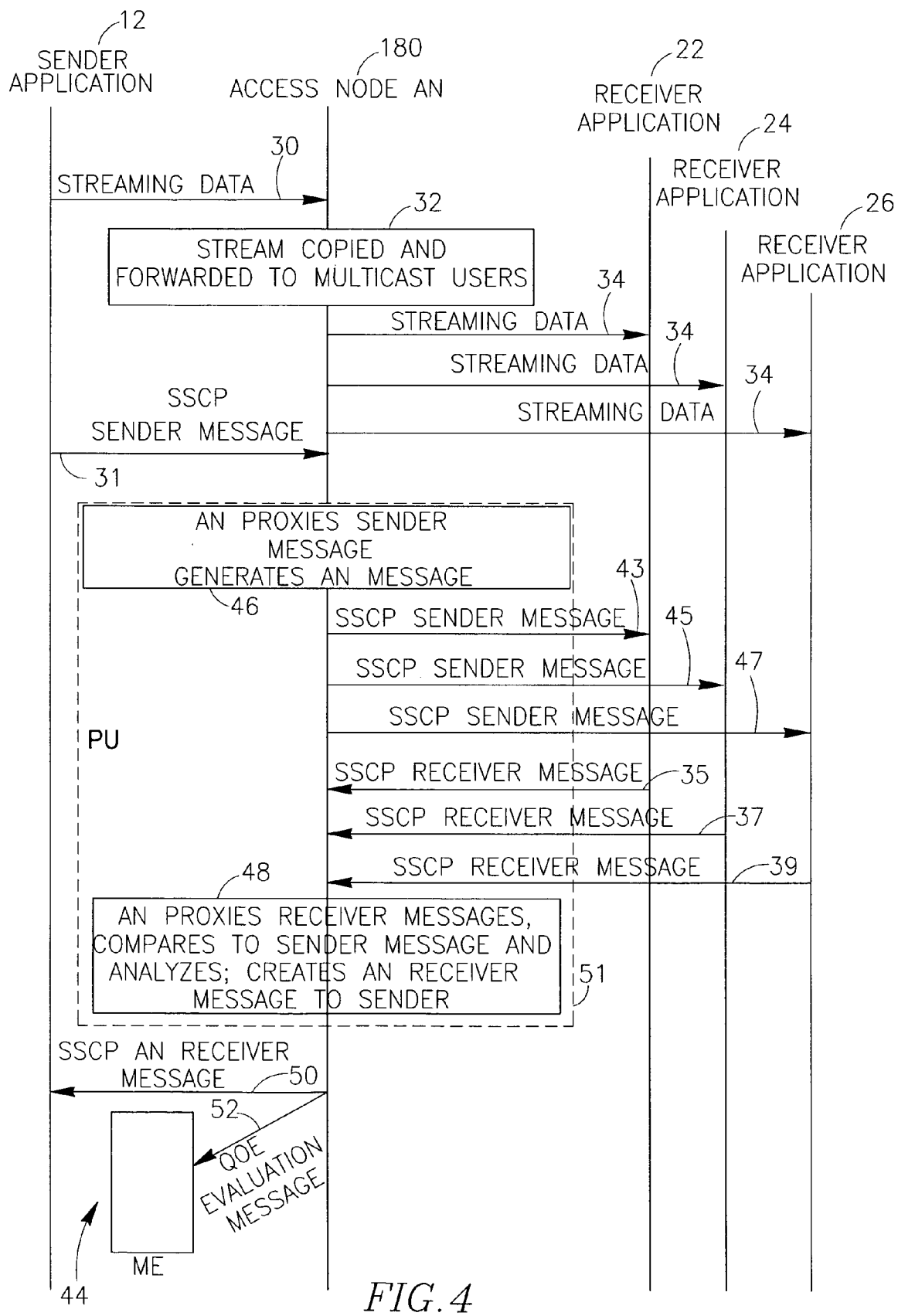
FIG. 4 is another example of the proposed technology for handling SSCP messages in an access network.

FIG. 4 illustrates a functional chart of another example of a modified access node 180. The chart comprises a number of functions similar to those in FIGS. 2 and 3. However, FIG. 4 illustrates a new intermediary functionality of the modified Access Node (AN) 180, being a so-called "proxy" functionality. The access node 180, similarly to the access node 118 of FIG. 3, provides information about status of access network to a monitoring entity ME 44. In this example, it is executed in the form of a QOE evaluation message 42.

The Access Node 180 serves as an SSCP Proxy. As a proxy, the Access Node 180 will play a role of a receiver application towards the sender application 12 (on the section from sender to access node). The Access Node 180 will also serve as a sender application towards the final receiver applications 22, 24, ... 26 (on the section from the access node to the multiple receivers). In this role, the Access Node 180, by means of a proxy block 46, creates from the SSCP Sender message 31 a number of individual SSCP messages—SSCP AN messages 43, 45, 47. These messages may be different, or be sent with different frequency, etc.

In such a proxy mode, when receiving the report messages 35, 37, 39 from the receivers, the Access Node 180, with the aid of an analyzing unit 48, will be able to compare these messages with the sender message, analyze the results and create its own receiver message (SSCP AN receiver message 50) which will accumulate both the QOE information concerning the receivers 22, 24, 26, and the QOE information concerning the AN 180 as a receiver of the data stream 30. The Access Node 180 will therefore be able to provide to the sender application 12 a QOE picture between the sender 10 and Access Node, and a QOE picture between the Access Node and each of the receivers of the multicast stream. By combining the two pictures, a general QOE picture can be established end to end (from sender to receivers).

To emphasize and further utilize the possibility of obtaining the QOE pictures of the combined network, from the sender up to the access network receivers, the Access Node 180 (say, its analyzing block 48) is adapted to generate an QOE evaluating message 52 which is issued to the Monitoring Entity 44.

FIG. 4 illustrates the system where the monitoring entity ME 44 is located beyond the access node AN 180 which incorporates the Processing unit PU 51 (blocks 46&48). Modern access nodes such as DSLAM (Digital Signal Line Access Multiplexer) or MSAN (Multiservice Access Node) can be modified to incorporate the proposed PU and even ME. However, various arrangements are possible, as has been mentioned before with reference to FIG. 3.

With respect to possible configurations of the system, it should be kept in mind that an access network can be served by more than one access nodes AN, and that more than one processing units PU and monitoring entities ME may be utilized and may cooperate with one another in various combinations for monitoring the mentioned access network.

Figure 5:
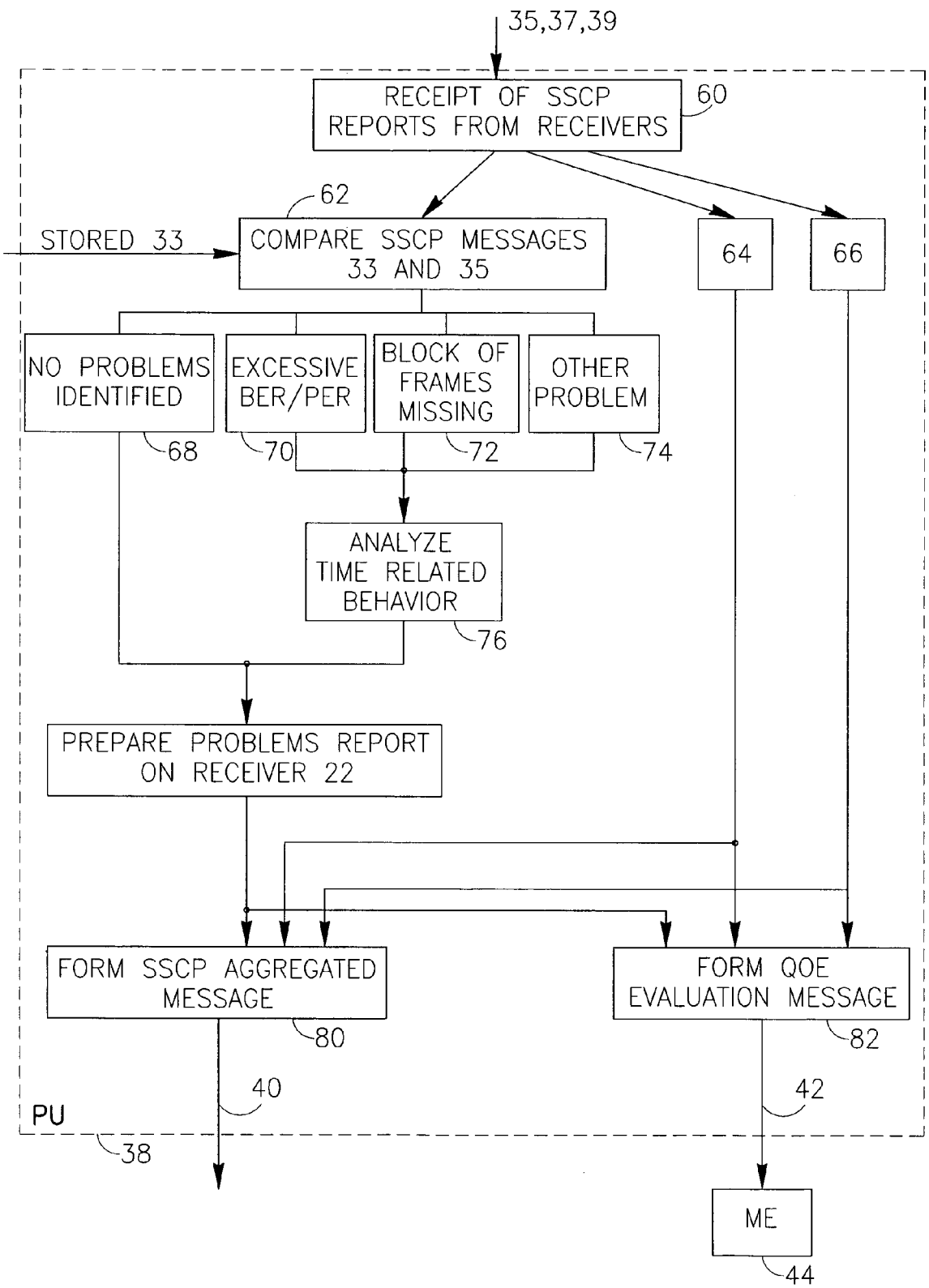
FIG. 5 schematically shows an exemplary block diagram for analyzing SSCP messages of multicast receivers for building inventory information of the access network.

FIG. 5 presents a block diagram being a schematic example that lists some operations performed in the novel analyzing block 38 (see FIG. 3). Block 38 is the main block of the Processing Unit PU 41; it is responsible of processing the SSCP report messages with QOE data, received from multicast receivers 22, 24, 26 at the Access Node 118. The example indicates some parameters which were checked at the multicast receivers to detect specific problems, for further reflecting them in QOE data of the report messages. Such problems to be checked, for example, are excessive PER (Packet Error Rate), excessive BER (Bit Error Rate), missing frames, noise ratio, etc.

The analyzing block 38 comprises an SSCP receipt block 60 which receives report messages 35, 37, 39 and distributes them to processing blocks 62, 64, 66 (per receiver). The processing block 62 related to receiver 22 is shown in more detail, with its accompanying group of supplementary operation blocks. The processing blocks 64 and 66 of the receivers 24 and 26 are similar to the group of block 62, and should be understood as performing analogous functions with respect to reports of receivers 24 and 26.

Block 62 analyzes QOE data in the report SSCP message 35 in comparison with the QOE data in the SSCP message 33 which was stored in the Access Node 118 and is now fed to block 62. The result of analysis may be, for example, that no problem is identified by receiver 22 (block 68), that receiver 22 has detected a pattern of excessive Bit Error Rate BER or Packet Error Rate PER (block 70), that a block of data packets is missing at the receiver 22 (block 72), or any other problem, say, excessive noise level, is detected at the transmission path (Block 74). All these or other problems are monitored to analyze their time related behavior (block 76), for example to detect whether the problem is persistent or random, whether there is a congestion problem perceived by the specific receiver/link, etc.

Based on results of the analysis performed by block 76, the Access Node 118 prepares a problems report concerning receiver 22. Similarly, the Access Node 118 prepares (in the blocks 64, 66) reports concerning the remaining multicast receivers 24, 26. These partial reports are then fed a) to block 80, to form the SSCP Aggregated message 40 for the Sender, and b) to block 82, in order to form the combined QOE evaluation message 42 which is further used for creating status information of any problems in receivers/transmission paths of the access network 20.

The responsible monitoring entity ME 44 receives the message 42 (which, in principle, can be formed upon each multicast session performed to those or different receivers of the access network) and thus updates the status information in its data base.

The monitoring entity ME 44, in cooperation with the Processing unit 51, allows producing alerts and performing the following actions:

Filter the reports to look for patterns. Based on the application sensitivity to Bit errors and Frame errors, the ME at the Network provider or the Network service/management system creates presentations that emphasize problematic links vs. good links or sections;

Identify persistent problems related to a specific receiver and initiation of corrective actions as needed.

Identify persistent problems in Sender—access node links/sections. Such persistent problems may indicate congested links that cause repetitive loss of frames. The ME then initiates corrective actions to remedy the problem.

Identify problems that arise during peak-time consumption of multicast services. In many cases the noise level rises when many subscribers use the links extensively for streaming. In view of that, the multicasting at the access node can be regulated accordingly.

The benefits of the invention are numerous:

By a simple method (snooping or proxy of the SSCP protocol messages) in the access node, valuable QOE data can be collected, analyzed and stored in a specified Data Base of a Monitoring entity Alternative methods to produce such data are much more complicated and include specifically dedicated hardware for the purpose of QOE analysis;

The Sender application can receive processed data with valuable QOE information that may affect its streaming behavior;

The Monitoring Entity, for example residing at a Network and/or Service provider, using the created specified Data Base, can collect and evaluate valuable QOE data about their streaming services, find problematic links and take care of congestion cases.

It should be appreciated that other modifications of the proposed technique can be suggested in addition to those described and illustrated as specific examples, and such modifications should be considered part of the invention as far as being covered by the claims which follow.

REFERENCES

[1] IETF RFC 3550 RTP: A Transport Protocol for Real-Time Applications
[2] Dan Komosny, Vit Novotny, Tree Structure for Source-Specific Multicast with Feedback Aggregation;
[3] US Patent US2006/0069799 AA—Wager Stefan et al, Reporting for Multi-User services in a wireless network

The invention claimed is:

1. A method for handling SSCP messages received at an access node that serves an access network, the method comprises:
    multicasting, by the access node, a traffic stream generated by a source, to two or more access network receivers, wherein a Streaming Service Control Protocol SSCP is utilized for said traffic stream and wherein each of said two or more access network receivers is served via a transmission path in the access network;
    processing SSCP report messages received at the access node from said two or more access network receivers, comprising analyzing of Quality of Experience QOE data retrieved from said SSCP report messages;
    based on the analyzed QOE data, providing status information, wherein the status information comprises indication of problems, if any, per access network section wherein said access network section includes a receiver out of said two or more access network receivers and a transmission path associated with said receiver in the access network;
    using the status information in monitoring the access network,
    wherein said method further comprises performing one or more of the following functions:
    filtering the status information to distinguish problematic receivers and their associated transmission paths versus non-problematic ones;
    identifying persistent problems related to specific problematic receivers and their associated transmission paths;
    identifying problems of peak-time consumption of multicast services;
    generating alerts; and
    initiating corrective actions if needed.

2. The method according to claim 1, further comprising: accumulating and updating the status information about said two or more access network receivers and their associated transmission paths; forming indications of persistent problems in the transmission paths and generating alerts about the persistent problems.

3. The method according to claim 1, wherein the processing comprises a preliminary step of handling an SSCP sender message received by the access node with said traffic stream transmitted from the source, and further comparing said sender SSCP message with the report SSCP messages received at the access node from the two or more access network receivers, by checking of at least one of the following parameters of the QOE data: a number of lost frames, BER value, PER value, noise ratio at a specific receiver in comparison with a threshold value set for the respective parameter and in comparison with the respective parameter in the sender SSCP message.

4. A system for handling SSCP messages, comprising at least one access node AN, at least one processing unit PU and at least one monitoring entity ME,
    wherein said at least one access node AN is capable of supporting a Streaming Service Control Protocol SSCP and serving two or more access network receivers of an access network via two or more respective transmission paths; the access node being capable of multicasting a traffic stream, generated by a source, to said two or more access network receivers and to receive report SSCP messages from said two or more receivers; said at least one processing unit PU being adapted to process the report SSCP messages, form status information and supply it to said at least one monitoring entity ME,
    wherein the processing comprises analyzing Quality of Experience QOE data retrieved from said SSCP report messages, the status information is formed based on the analyzed QOE data and comprises indications of problems, if any, per access network section,
    wherein said access network section includes a receiver out of said two or more access network receivers and a transmission path associated with said receiver in the access network; said at least one monitoring entity ME being capable at least of monitoring the access network using said status information, and
    wherein said system is further configured to perform one or more of the following functions:
    filtering the status information to distinguish problematic receivers and their associated transmission paths versus non-problematic ones;
    identifying persistent problems related to specific problematic receivers and their associated transmission paths;
    identifying problems of peak-time consumption of multicast services;
    generating alerts; and
    initiating corrective actions if needed.

5. The system according to claim 4, wherein the access node is a Digital Signal Line Access Multiplexer DSLAM or a Multiservice Access Node MSAN.

6. A monitoring entity ME for monitoring an access network, the ME being adapted to cooperate with at least one access node AN handling SSCP reports messages obtained from two or more access network receivers in response to a multicast traffic stream sent to said two or more access network receivers from said at least one access node AN, the ME being capable of:
    receiving, from said at least one access node AN, Quality of Experience QOE information reflecting QOE data obtained from said SSCP reports messages, wherein QOE data obtained from one SSCP report message characterizes Quality of Experience of a specific access network receiver while receiving said multicast traffic stream;
    analyzing said QOE information;
    based on the analysis, providing status information and registering it, wherein the status information comprises indication of problems, if any, per access network section and wherein said access network section includes a receiver out of said two or more access network receivers and a transmission path associated with said receiver in the access network; and
    monitoring the access network using said status information being updated by receiving and analyzing more QOE information from said at least one access node AN,
    wherein said ME is further configured to perform one or more of the following functions:
    filtering the status information to distinguish problematic receivers and their associated transmission paths versus non-problematic ones;
    identifying persistent problems related to specific problematic receivers and their associated transmission paths;

identifying problems of peak-time consumption of multicast services;
generating alerts; and
initiating corrective actions if needed.

7. A software product comprising computer implementable instructions and data stored on a non-transitory computer readable medium; the software product being capable of implementing operations of the method according to claim 1, when being run in a computer.

* * * * *